United States Patent [19]

Guy et al.

[11] Patent Number: 5,724,901
[45] Date of Patent: Mar. 10, 1998

[54] OXYGEN-ENRICHED GAS BURNER FOR INCINERATING WASTE MATERIALS

[75] Inventors: Christophe Guy, Montreal; Jamal Chaouki, Pointe-Claire; Jean-Guy Chouinard, Verdun, all of Canada

[73] Assignee: Gaz Metropolitan and Company Limited, Montreal, Canada

[21] Appl. No.: 552,280

[22] Filed: Nov. 2, 1995

[51] Int. Cl.$^6$ .................................................. F23G 5/00
[52] U.S. Cl. .................. 110/346; 110/238; 110/262; 110/265; 110/104 B; 431/5; 431/284
[58] Field of Search ................................. 110/237, 238, 110/346, 260–262, 265, 104 B, 244; 431/284, 285, 5, 187

[56] References Cited

U.S. PATENT DOCUMENTS

| | | | |
|---|---|---|---|
| 4,094,625 | 6/1978 | Wang et al. | 110/238 X |
| 4,726,760 | 2/1988 | Skoog | 110/265 X |
| 5,042,964 | 8/1991 | Gitman | 431/284 X |
| 5,129,333 | 7/1992 | Frederick et al. | 110/238 X |
| 5,188,042 | 2/1993 | Lauwers | 110/238 X |
| 5,217,363 | 6/1993 | Brais et al. | |

OTHER PUBLICATIONS

Heat Treatment and Incineration of Divided Solids in a cocurrent downwards gas–solid reactor by M. Benali et al., Eng. Sc., vol. 47, No.9–11, pp 2431–2436 (1992).

Thermal treatment of divided solid wastes by the gas–contact process, by M. Benali et a l., Chemical Engineering and Processing, 31 (1992) 277–284.

*Primary Examiner*—Henry A. Bennett
*Assistant Examiner*—Susanne C. Tinker

[57] ABSTRACT

An oxygen-enriched gas burner and method of operation thereof for incinerating and/or melting and/or vitrifying and/or performing thermal treatment and/or oxidizing ground/liquid waste materials and particularly, but not exclusively, contaminated waste materials. The burner comprises a body having annular chambers and defining an injection nozzle which is adjustable whereby to adjust the configuration of a flame and wherein the nozzle is provided, at the center thereof with an axial feed port through which the grounded solid/liquid waste material is injected within the flame. The waste material is fed axially within the flame under control pressure with the waste feed and flame configuration being adjusted independently from one another whereby the waste material is substantially incinerated without substantially affecting the combustion of the gas which would otherwise produce undesirable carbon monoxide and hydrocarbons.

9 Claims, 3 Drawing Sheets

OXYGEN-ENRICHED GAS BURNER FOR INCINERATING WASTE MATERIALS

TECHNICAL FIELD

The present invention relates to an oxygen-enriched gas burner and method of operation for incinerating and/or melting and/or vitrifying and/or performing thermal treatment and/or oxidizing ground waste materials and particularly, but not exclusively, dangerous and toxic waste materials. The waste material is injected axially within the flame and the characteristic of the flame as well as the rate of feed of the waste material are adjusted independently from one another dependent on the type of waste material being incinerated.

BACKGROUND ART

Because of tighter environmental restrictions and escalating transportation and dumping costs, the incineration of solid waste or liquid waste materials has become a viable method of disposal. It is well known that solid waste is harmful when disposed of in the environment, such as in landfills, as it produces long-term environmental and health effects, especially with respect to ground water and soil contamination. It is believed that incineration is a major solution for the disposal of many industrial solid wastes. The heat released during the process can be used for various applications and the non-combustible residue can be recycled or used for different purposes. Depending on the type of waste and on the temperature of incineration, air pollution control systems have often been found to be necessary.

If the heating value of the solid waste is low or if the required incineration temperature is high, hot air or burners are needed. Fluidized beds, rotating kilns, moving beds, cyclone cascades and raining particle heat exchangers are among the incineration systems based on heat transfer from high temperature fumes or gas to solids by direct contact. The selection of one of these systems is usually based on several parameters and criteria such as operating conditions (gas and solid flow rates), low pressure drop, high thermal efficiency, stability and flexibility of operation, easy integration in the overall industrial unit and low investment and operating costs.

With reference to French Patents 2,543,280, 2,669,100, 2,616,519 and French National Registration No. 91 15 940, all granted to Gaz de France, these patents disclose systems for the incineration of waste and called gas-contact processes which are based on the injection of solid waste directly into the core of a flame of a counter-rotation natural gas burner where the solid waste undergoes high temperature incineration. In some of the systems proposed, the burner is fitted at the top of a vertical cylindrical furnace where the falling particles are incinerated by a concurrent flow of hot gas. The gas flows in through radial ports while air is injected through two rows of tangential orifices causing rotation in opposite directions. Although the resulting swirl is null, mixing is very intensive. The solid particles are injected in the combustion chamber where they are caught in the strong mixing of the gas and combustion air due to the counter-rotation effect. Although these burners show an excellent flame stability and an exceptional air factor flexibility, they have not proved totally efficient for burning different types of solid or liquid waste materials. By introducing waste materials in the flame it affects the combustion of the material itself as well as the gas and produces carbon monoxide (CO) and possibly hydrocarbons and accordingly results in an emission problem. These systems are particularly useful for applications such as foundry sand reclamation, gypsum dehydration, dust decyanidation in manganese production, removal of toxic products contained in zinc oxides and treatment of paint sludges.

U.S. Pat. No. 5,217,363 relates to an air-cooled oxygen gas burner for use with a direct fired furnace and wherein the injection nozzle assembly of the burner has concentric openings which are adjustable to vary the velocity of the gas, oxygen and air injected within the furnace whereby to vary the shape or the characteristic of the flame and wherein the temperature, radiation/convection of the flame may be modified by varying the pressures and injection ports. That gas burner was developed for use in aluminum melting processes which requires a flame of very high temperature to cause the aluminum to melt quickly so as to reduce the oxidation time in the furnace. The burner results in reduced energy consumption, reduction in oxidation and increased production by shortening the melting time of the aluminum melt thereby resulting in a production increase.

SUMMARY OF INVENTION

We have discovered that in order to effectively incinerate and/or melt and/or vitrify and/or perform a thermal treatment and/or oxidize waste materials it is important to control the intensity of the flame, dependent on the material being treated, and to position the material or mix it with the flame in such a manner as to achieve substantially total incineration without affecting the gas mixture and therefore not producing hydrocarbons. Feeding the material into a turbulent flame is not necessarily the answer to total incineration as the material may be subjected to certain parts of the turbulent flame mixture where the temperature is not sufficient to achieve incineration. Therefore, there are two important parameters to consider in order to achieve substantially total incineration and these are to be able to control the temperature of the flame and to inject the waste material in the hot spot of the flame without affecting the combustion of the gas and at a rate wherein the residence time of the waste material will assure substantially total incineration of the material.

It is therefore a feature of the present invention to provide an oxygen-enriched gas burner and method for incinerating and/or melting and/or vitrifying and/or performing thermal treatment and/or oxidizing ground waste materials to achieve substantially total incineration thereof.

Another feature of the present invention is to provide an oxygen-enriched gas burner and method for incinerating and/or melting and/or vitrifying and/or performing thermal treatment and/or oxidizing ground dangerous or toxic waste materials, and wherein the characteristic of the flame is totally controllable and wherein the waste material is fed axially within the flame at a control feed rate without affecting the combustion of the gas.

According to the above features, from a broad aspect, the present invention provides an oxygen-enriched gas burner for incinerating and/or melting and/or vitrifying and/or performing thermal treatment and/or oxidizing ground waste materials. The burner comprises a burner body formed by three concentrically supported metal tubes defining therebetween a first and a second annular chamber. A frusto-conical injection nozzle is formed at an inner end of the metal tubes and defines adjustable annular ports by axial displacement of one or more of the tubes. Means is provided to retain the injection nozzle concentrically in a circular cavity of a refractory wall of a furnace housing and for supporting the tubes outside the housing. The circular cavity has an outwardly tapered side wall to form a third annular port with the inner end of an outer one of the metal tubes. Spark producing means is supported by the housing adjacent the injection nozzle to ignite an oxygen/gas mixture fed through the adjustable annular ports. An inner one of the metal tubes defines at the interior thereof an axial feed port. Means is provided at an outer end of the feed port to introduce under regulated pressure therein a grounded solid/liquid waste material to feed axially within a flame at the nozzle. Independent flow adjustment means is provided to feed under pressure a combustible gas and oxygen in the first and second chambers, respectively. Further adjustment means is provided to feed air under pressure in the third chamber. Means is further provided to axially displace the three metal tubes independently from another to vary the size of the ports and consequently the characteristic of the flame in relation to the grounded solid/liquid waste material introduced axially within the flame at a controllable flow rate whereby to incinerate the grounded solid/liquid waste material.

According to a still further broad aspect of the present invention there is provided a method of incinerating and/or melting and/or vitrifying and/or performing thermal treatment and/or oxidizing a ground/liquid waste material comprising the steps of providing a burner housing having a gas injection nozzle provided with adjustable circumferential ports to vary the shape of a high temperature flame produced at the nozzle. Pressure control means is provided to control the pressure of oxygen, gas and air fed to respective ones of the ports with an outer one of the ports receiving the air. The injection nozzle has an axial feed port. The circumferential ports are adjustable and pressure control means is provided to produce a flame having a desired characteristic dependent on the powder/liquid waste material to be incinerated. The method also comprises feeding the powder/liquid waste material into the axial feed port and out into the flame at the center of the circumferential ports and axially of the flame and at a controllable flow rate whereby to incinerate the waste material.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
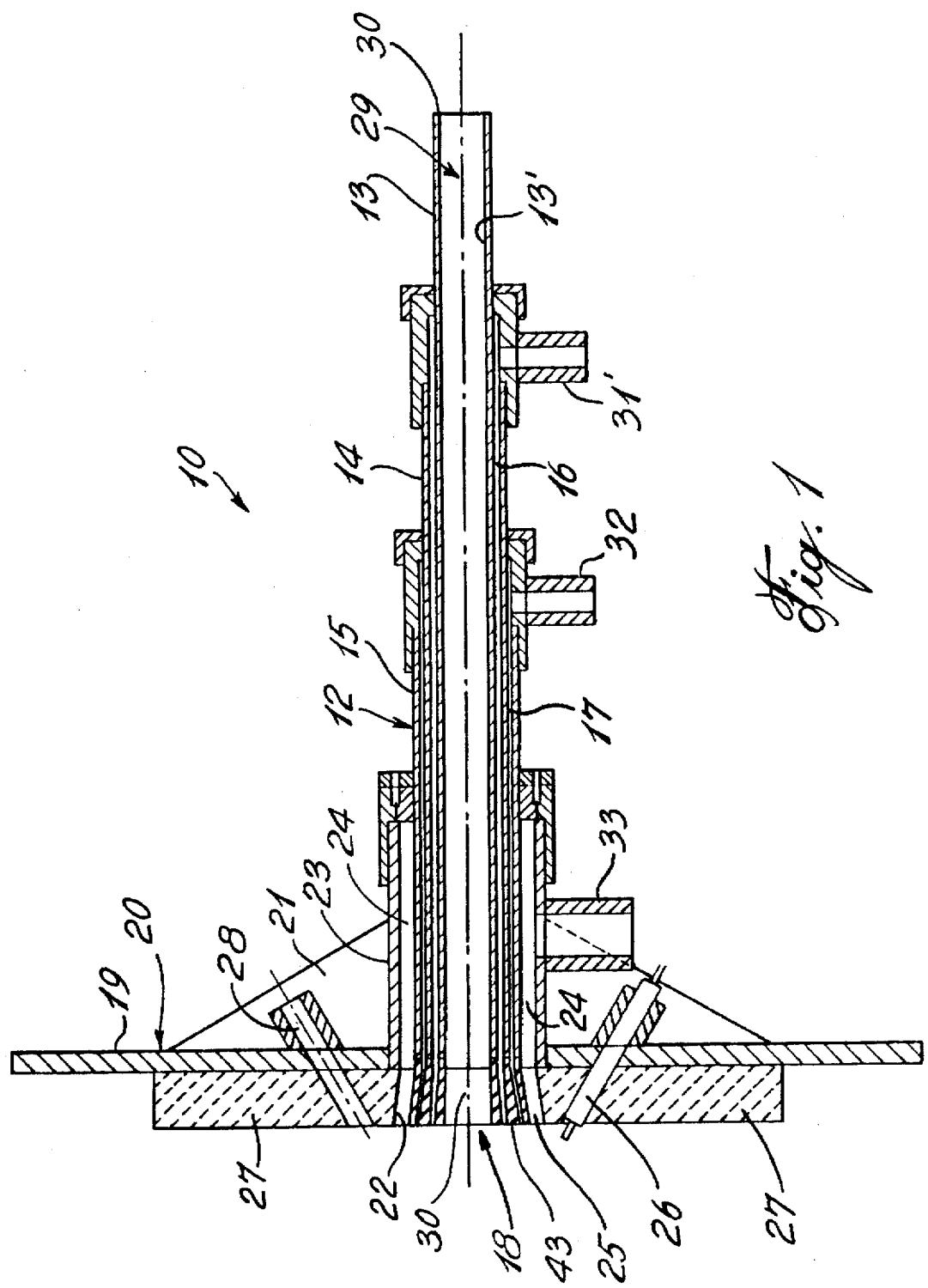
FIG. 1 is a side section view showing the oxygen-enriched gas burner of the present invention as secured to a refractory side wall of a furnace housing.
Figure 2:
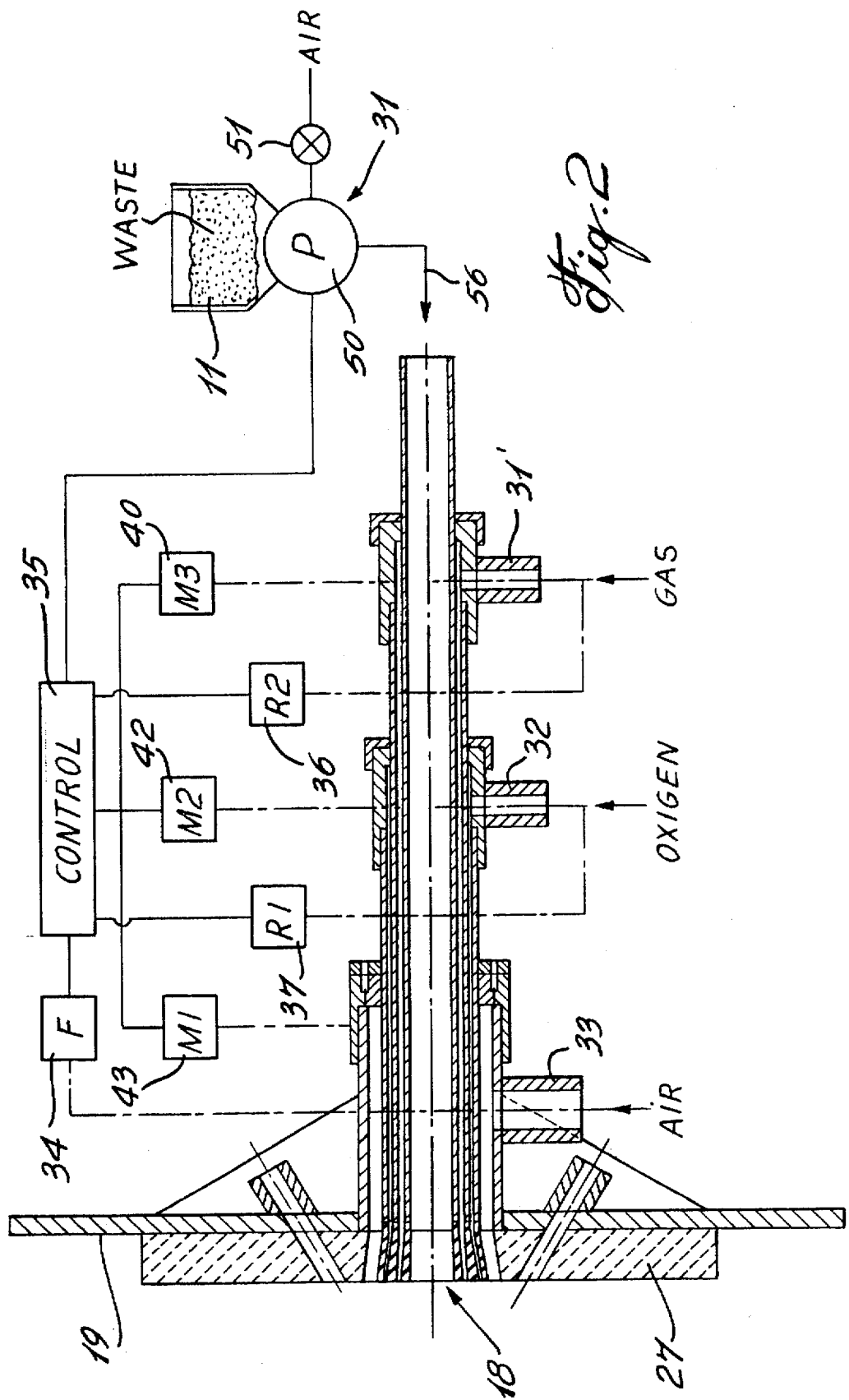
FIG. 2 is a view similar to FIG. 1 but illustrating schematically the various controls associated with the burner whereby to control the characteristic of the flame as well as the flow rate of the waste material.

Referring now to the drawings and more particularly to FIGS. 1 and 2, there is shown generally at 10, the oxygen-enriched gas burner of the present invention for incinerating and/or melting and/or vitrifying and/or performing thermal treatment and/or oxidizing ground and/or liquid waste materials 11, as shown in FIG. 2. The waste materials may be sludges, divided solid waste contaminated soils, powders, solid particles, liquids and any other suitable dangerous or toxic waste materials. The burner is of the type capable of developing between 50 KW to 500 MW of power and comprises a burner body 12 formed by three concentrically supported metal tubes 13, 14 and 15 forming therebetween a first and a second annular chamber, herein a gas chamber 16 and an outer oxygen chamber 17. These tubes are outwardly angled at a nozzle end to define a frusto-conical injection nozzle 18. The burner body 12 is secured to the outer wall 19 of the furnace 20, herein showing only a section thereof, by suitable support means such as support plates 21 whereby to position the injection nozzle 18 concentrically within a circular cavity 22 having a conical side wall spaced substantially parallel to the outer metal tube 15 of the burner body. A further metal tube 23 is supported spaced and concentrically about the third tube 15 to define therebetween an air chamber 24 to inject air about the nozzle 18 through the outer concentric port 25. A spark plug 26 extends through the refractory wall 27 of the furnace and is disposed in the vicinity of the nozzle 18 whereby to ignite the gas mixture to create a flame. A peep hole 28 suited with a detector (not shown) is provided to assure that the gas has ignited to produce the flame.

An important feature of the present invention is the fact that the interior 13' of the first metal tube (the inner one of the tubes) is used as a feed port 29 in which to feed the waste material 11 axially within the flame with the gas and oxygen fed thereabout so as to not affect the combustion of the gas which would otherwise produce hydrocarbons, which is undesirable pollution. The waste material is injected from the end 30 of the feed port by suitable feed apparatus such as that schematically illustrated at 31 in FIG. 2. The gas is injected within the gas chamber 16 through a further coupling 31' and the oxygen through a coupling 32. Another coupling 33 permits the introduction of air by means of a fan 34 and conduit, as shown in FIG. 2.

As shown in FIG. 2, a suitable control circuit 35 is provided whereby to control pressure regulators 36 and 37 associated respectively with the gas and oxygen supplies to the inlets 31' and 32 whereby to control the quantity and pressure of these gases to provide a suitable mixture to produce a desired flame characteristic dependent on the type of waste material being burned. The control circuit 35 also controls the fan 34 to provide a suitable quantity of air to be injected about the flame. The air also provides a cooling effect immediately adjacent the nozzle, as illustrated at 38 in FIG. 4 and in the immediate vicinity of the refractory wall. The hottest part of the flame is along its central axis 39 where the waste material 11 is injected. The control circuit 35 also controls motors 40, 41 and 42 which displace the tubes axially whereby to vary the size of the annular openings 43 in the injection nozzle 18 to vary the port size and the ratios of oxygen to gas injected within the flame. The gas herein used is a natural gas although other gases may be used. The description of the operation of the injection nozzle ports is described in the above-referenced U.S. Pat. No. 5,217,363 and will not be repeated herein.

As also shown in FIG. 2, the control circuit 35 controls a pressure regulated pump 50 associated with the feed apparatus 31 whereby to feed the waste material 11 at a desired flow rate. The pump may also be provided with a controllable valve 51 to introduce a controlled amount of air within the waste mixture.

Figure 3:
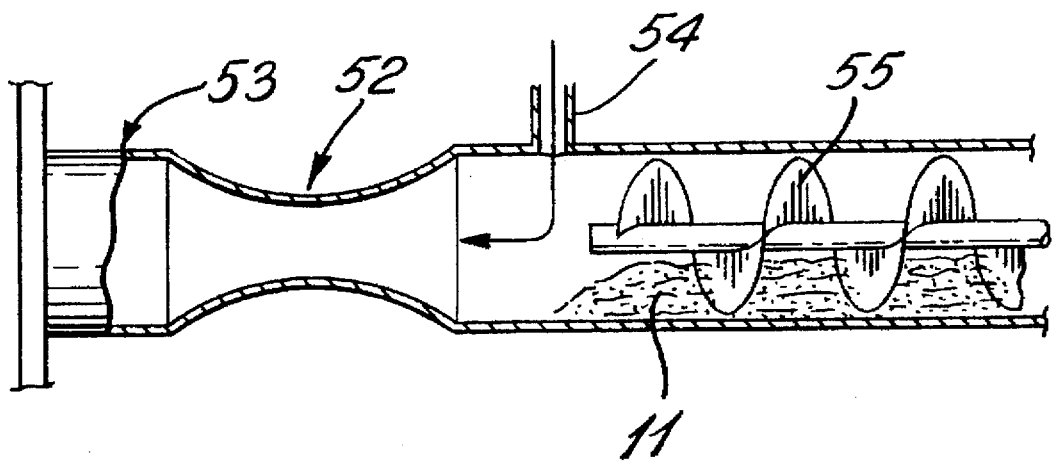
FIG. 3 is a simplified schematic view showing a modification to the axial feed port to inject the waste material axially within the flame at a control flow rate.

As shown in FIG. 3, the feed apparatus 31 may also be provided with a venturi 52 formed within an inlet coupling 53 to create a turbulent high pressure injection of the air enriched grounded solid/liquid waste material 11. The venturi 52 creates a suction of the air enriched waste material 11 and further admixes further air therein through the nozzle 54 whereby the waste is injected as particles or droplets in the range of 2 microns to 1 cm. As hereinshown the mixture may be fed by an auger-type feeder screw 55.

Figure 4:
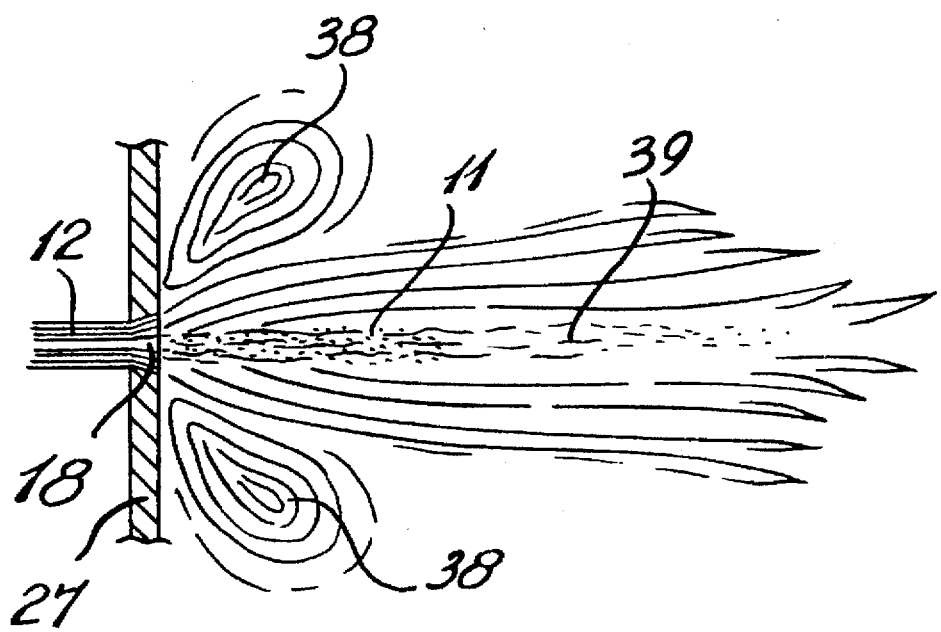
FIG. 4 is a schematic illustration of the flame with the waste material injected axially therein.

As previously described and with reference to the FIG. 4 it can be seen that the flame created is totally controllable with the axial center of the flame 39 being at the highest temperature. By varying the pressure and the size of the openings of the injection ports to vary the quantity of gas and oxygen and also by varying the air introduced through the outer concentric port 25, a flame having a desired characteristic is produced such as to assure that the temperature of the flame is sufficient to totally incinerate the waste material 11 which is fed into the flame through an axial feed port 30. Also, to ensure good incineration and/or melting and/or vitrifying and/or performing thermal treatment and/or oxidizing of the waste material it is important to control the flow rate of the material through the feed port 29 and this is achieved by the various pressure regulated feed apparatus 31 provided. Although certain types of apparatus have been generally described, it is obvious to a person skilled in the art that these may be modified to produce an adjustable flow rate of such materials and suitable for use with the apparatus of the present invention. The broad aspect of the method and apparatus of the invention is to control the various parameters of the flame to produce a flame having a desired characteristic and to feed the powder/liquid waste material axially within the flame at a controllable flow rate whereby to substantially totally incinerate the waste material without substantially affecting the combustion of the gas mixture.

It is of course within the ambit of this invention to provide any other obvious modifications of the preferred embodiment described, provided such modifications fall within the scope of the appended claims.

We claim:

1. An oxygen-enriched gas burner comprising a burner body formed by three concentrically supported metal tubes defining therebetween a first and a second annular chamber, a frusto-conical injection nozzle formed at an inner end of said metal tubes and defining adjustabtable annular ports by axial displacement of one or more of said tubes, means to retain said injection nozzle concentrically in a circular cavity of a refractory wall of a furnace housing and for supporting said tubes outside said housing, said circular cavity having an outwardly tapered side will to form a third annular port with said inner end of an outer one of said metal tubes, spark producing means supported by said housing adjacent said injection nozzle to ignite an oxygen-gas mixture fed through said adjustable annular ports, an inner one of said metal tubes defining at the interior thereof an axial feed port, means at an outer end of said feed port to introduce under regulated pressure therein a waste material capable of being fed axially within a flame at said nozzle, independent flow adjustment means to reed under pressure a combustible gas and oxygen in said first and second chambers respectively, further adjustment means to reed air under pressure in an annular chamber communicating with said third annular port, means to axially displace said three metal tubes independently from one another to vary the size of said ports and consequently the characteristic of said flame in relation to the waste material introduced axially within the flame at a controllable flow rate whereby to incinerate said grounded waste material.

2. An oxygen-enriched gas burner as claimed in claim 1 wherein said burner is of the type capable of developing between 50 KW to 500 MW of power.

3. An oxygen-enriched gas burner as claimed in claim 1 wherein there is further provided an air pump connected to said axial feed port to air enrich said waste material fed to said burner.

4. An oxygen-enriched gas burner as claimed in claim 3 wherein said axial feed port has a venturi constructed therein to create a turbulent high pressure injection of said oxygen enriched waste material to feed particles or droplets of said waste axially into said flame.

5. An oxygen-enriched gas burner as claimed in claim 4 wherein said waste material is introduced upstream of said venturi by supply means to discharge said waste in particles or droplets form, said particles or droplets being sized within the range of 2 microns to 1 cm.

6. An oxygen-enriched gas burner as claimed in claim 1, wherein said waste materials are hazardous toxic waste materials.

7. A method of incinerating a waste material comprising the steps of:

i) providing a burner housing having a gas injection nozzle provided with adjustable circumferential ports to vary the shape of a high temperature flame produced at said nozzle, pressure control means to control the pressure of oxygen, gas and air fed to respective ones of said ports with an outer one of said ports receiving said air, said injection nozzle having an axial feed port, ii) controlling said adjustable circumferential ports and pressure control means to produce a flame having a desired characteristic dependent on said waste material to be incinerated, iii) feeding said waste material into said axial feed port and out into said flame at the center of said circumferential ports and axially of said flame at a controllable flow rate whereby to incinerate said waste material without substantially affecting the combustion of said gas.

8. A method as claimed in claim 7 wherein said step (iii) comprises mixing air with said waste material and feeding said waste material under controlled pressure to said injection nozzle through said feed port.

9. A method as claimed in claim 8 wherein said step (iii) further comprises feeding said waste material admixed with air into a venturi provided in said feed port to provide minute droplets or particles of said waste in the range of from about 2 microns to 1 cm.

\* \* \* \* \*